United States Patent [19]

Dorn et al.

[11] Patent Number: 4,742,730

[45] Date of Patent: May 10, 1988

[54] FAILSAFE ROTARY ACTUATOR

[75] Inventors: Rupert I. Dorn, Seattle; John D. Mayer; Neal A. Nelson, both of Bellevue, all of Wash.

[73] Assignee: The Boeing Company, Seattle, Wash.

[21] Appl. No.: 428,842

[22] Filed: Sep. 30, 1982

[51] Int. Cl.⁴ .............................................. F16H 37/06
[52] U.S. Cl. ...................................... 74/674; 74/785; 74/801
[58] Field of Search ................ 74/785, 788, 801, 797, 74/768, 769, 750 R, 802, 674

[56] References Cited

U.S. PATENT DOCUMENTS

| | | | |
|---|---|---|---|
| 284,274 | 9/1883 | Caldwell | 74/785 X |
| 2,369,867 | 2/1945 | Sprake | 74/785 |
| 2,966,808 | 1/1961 | Gradin | 74/801 |
| 3,008,355 | 11/1961 | Grudin | 74/801 |
| 3,015,973 | 1/1962 | Doerries | 74/801 |
| 3,203,275 | 8/1965 | Hoover | 74/801 |
| 3,640,150 | 2/1972 | Leiner et al. | 74/801 |

*Primary Examiner*—Leslie A. Braun
*Assistant Examiner*—Dwight G. Diehl
*Attorney, Agent, or Firm*—James P. Hamley; B. A. Donahue

[57] ABSTRACT

A failsafe rotary actuator having irreversible dual load paths between input and output members thereof is comprised of an input shaft journalled for rotation within a housing for the actuator, first and second sun gears secured in spaced relationship along and to the input shaft for rotation therewith, planet gears disposed for orbital rotation with and circulation about the sun gears, first and second fixed ring gears disposed for independent engagement with the planet gears, and first and second output gears disposed for independent driving contact with the planet gears; wherein a first load path is established between the first sun gear and the first output gear across the planet gears in cooperative engagement thereof with the first fixed ring gear, and a second load path is established between the second sun gear and the second output gear across the planet gears and cooperative engagement thereof with the second fixed ring gear.

8 Claims, 2 Drawing Sheets

FAILSAFE ROTARY ACTUATOR

TECHNICAL FIELD

The present invention relates generally to rotary actuators, more especially to rotary actuators for manipulating the control surfaces of an aircraft, and most particularly to a rotary actuator within such a context which provides dual load paths between the input and output members thereof in order to achieve a failsafe, stiff link with the control surface restraining it in position in the event of a single mechanical failure.

DESCRIPTION OF THE BACKGROUND ART

Rotary actuators are, of course, well-known devices having utility in diverse applications. A particularly common rotary actuator, or power hinge as it is sometimes called, is comprised of an input including a sun gear which mates with a plurality of planet gears disposed for rotation and circulation thereabout intermediate fixed ring gears. In turn, an output gear is driven which, depending upon the gear ratio, usually moves but a fraction of an arcuate distance in response to a full rotation of the input. Consequently, a rotary input to the sun gear of the output gear and any arcuate displacement of the output gear and any associated linkage member.

Turning to the intended field of utility for the instant invention, applicable requirements are very stringent in respect of those devices associated with a control surface of an aircraft. Unless a control surface is dynamically mass balanced, it must be held rigidly or damped at all times. But, mass balance imposes a severe weight penalty and it is therefore advantageous to strive for a rigidly maintained link with a control surface in order to realize a corresponding weight reduction. When pursuing that objective, multiple redundant devices must be utilized in order to guard against the loss of a rigid link with the control surface. Indeed, a failsafe characteristic as respects but a single device can be of paramount importance due to the obvious adverse consequences of an absence of at least one rigid link to the aircraft control surface under failure conditions.

With the foregoing understanding, it will now be appreciated that conventional rotary actuators may not meet the stringent requirements demanded in this environment. For example, in the event a pinion is stripped or a separator fails, resulting in collapse, the single load path through the device may lack the ability to provide the required stiff link. Back-driving through the actuator could occur under those circumstances; or similar loss of integrity may result in a failure to maintain the mandatory rigid link. Simply including a plurality of conventional actuators is not a practical or workable approach to meeting the multiple redundancy requirements. If one actuator or the input shaft between actuators fails, the linkage from the actuator output arm to the control surface may tend to operate through an overcenter position. Consequently, significant forces can be developed between the operating and the failed actuator and become self-destructive. Yet, to date, the art has not responded to these problems and provided a simple but efficient rotary actuator having failsafe features, whereby the same may find enhanced utility in association with an aircraft control surface. Thus, the need exists for such a device.

SUMMARY OF THE INVENTION

The present invention advantageously provides a failsafe rotary actuator which includes dual load paths between the input and output members thereof. The present invention provides the further benefit of maintaining each load path in an irreversible configuration to guard against back driving. Accordingly, the rotary actuator of the present invention is desirable for its ability to be associated with a control surface of an aircraft; as failure along one load path will nonetheless permit a rigid coupling through the second load path and maintain a stiff link to the control surface. Furthermore, while jamming of the actuator may ensue upon a failure, the position of the control surface will nonetheless be maintained.

The foregoing and other advantages are realized in accordance with one aspect of the present invention by a failsafe rotary actuator comprising a free planet, differential, epicyclic gearbox having dual load paths within a single actuator. In a particularly preferred implementation of the invention, the actuator comprises an input shaft having first and second sun gear means secured in spaced relationship thereon for coincident rotation therewith; a plurality of planet gear means disposed for rotation about the sun gear means, intermediate first and second opposed ring gear means and first and second discrete output gear means; first and second output means in cooperative engagement with a respective one of the output gear means; and center ring means disposed circumferentially about the actuator intermediate the dual load paths for failure isolation thereof. The center ring means is most preferably disposed intermediate the two output gear means, projecting radially outward therefrom and separately secured thereto by distinct arrays of fasteners; and wherein the arrays are staggered, thereby preventing failure on one side of the actuator from propagating to the other side. In this preferred, exemplary implementation, each planet gear spans the rotary actuator in cooperative engagement with both sun gear means, both fixed ring gear means and both output gear means. The failure of any one discrete component of the actuator of the present invention will not result in the loss of integrity of the device as a parallel load path is provided. In a related aspect of this preferred implementation, drive irreversibility is achieved by a choice of gear ratios and tooth form to prevent either load path from being back driven by the output (i.e., the control surface). Thus, if a driven by a single power source through a single load path input member, the output will remain fixed even if the single input member fails.

The foregoing and other advantages of the present invention will become more apparent, and a fuller appreciation of its structure and mode of operation will be gained, upon an examination of the following detailed description of the invention, taken in conjunction with the figures of drawing.

DETAILED DESCRIPTION OF THE INVENTION

Figure 1:
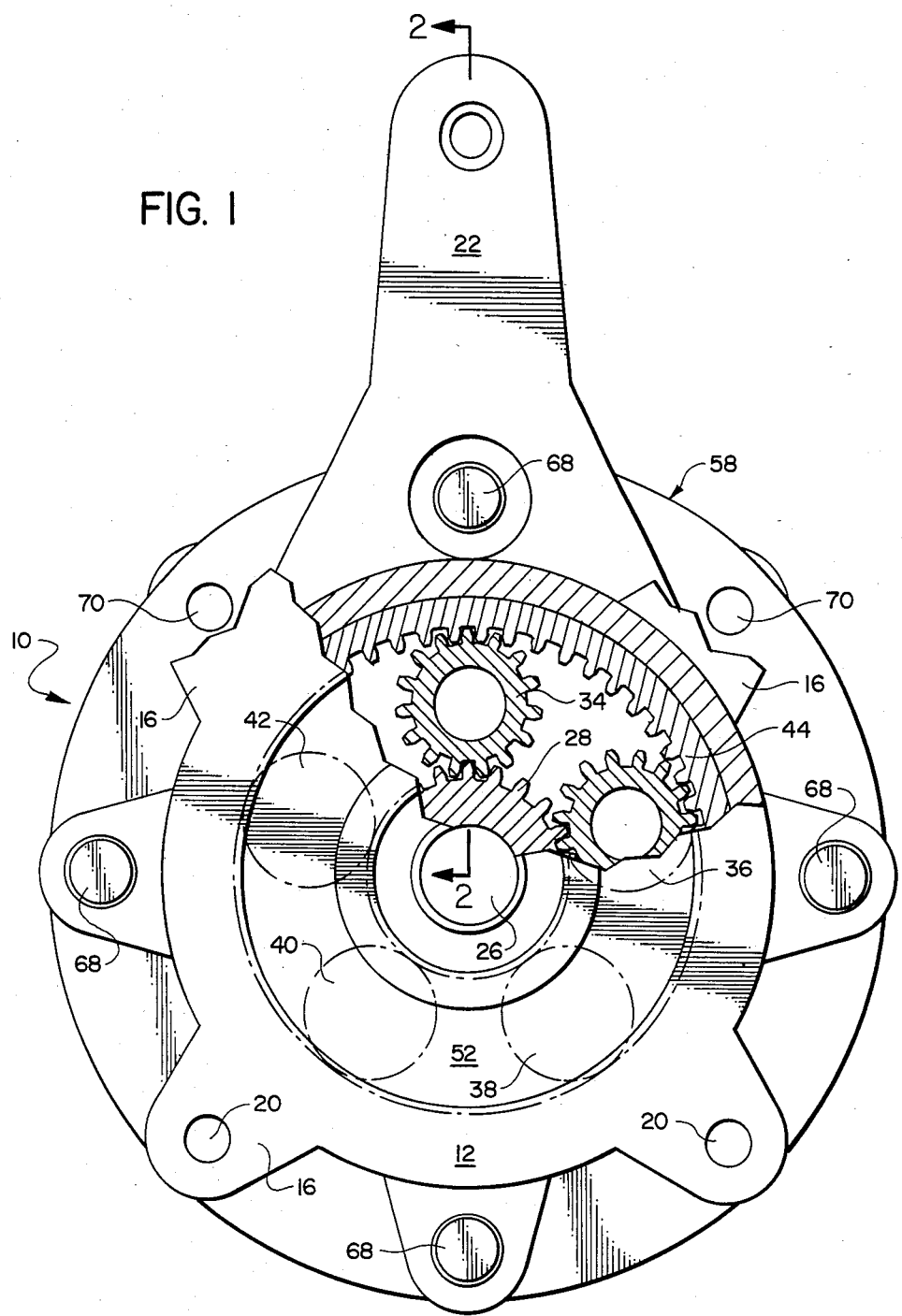
FIG. 1 is an end elevational view, with parts broken away for clarity, showing a rotary actuator in accordance with the present invention; and, FIG. 2 is a side view, partly in elevation and partly in section along the line 2—2 of FIG. 1, showing the gearbox structure of the rotary actuator of the present invention.

The present invention relates generally to rotary actuators, more especially to rotary actuators for manipulating control surfaces of an aircraft, and most particularly to a rotary actuator specifically configured for utility within that context to have dual load paths between the input and output members thereof in order to provide a failsafe, irreversible stiff link to the control surface even under failure conditions. Accordingly, the present invention will now be described with reference to certain preferred embodiments within that context; albeit, those skilled in the art will appreciate that such a description is meant to be exemplary only and should not be deemed limitative either of the scope of the particular embodiments or the intended field of utility.

Turning to the figures of drawing, in each of which like parts are identified with like reference characters, a rotary actuator in accordance with the present invention, designated generally as 10, is shown to be comprised of a body including generally circular end walls 12 and 14 and an enveloping casing. Mounting flanges 16 and 18 are associated with the end walls to secure the actuator 10 in a fixed position with respect to the output member(s) being driven. Suitable mounting holes 20 are provided to receive fixture means for that purpose. First and second output arms, 22 and 24 respectively, depend outwardly from the actuator 10 and are joined to, e.g., a control surface to be manipulated upon an input to the actuator. Thus, it will be appreciated that the movement required in respect of the output arms is one generally over an arcuate segment only, as opposed to full or multiple revolution; although the same structure may be used and the same advantages of the present invention may be realized in the latter event as well.

Figure 2:
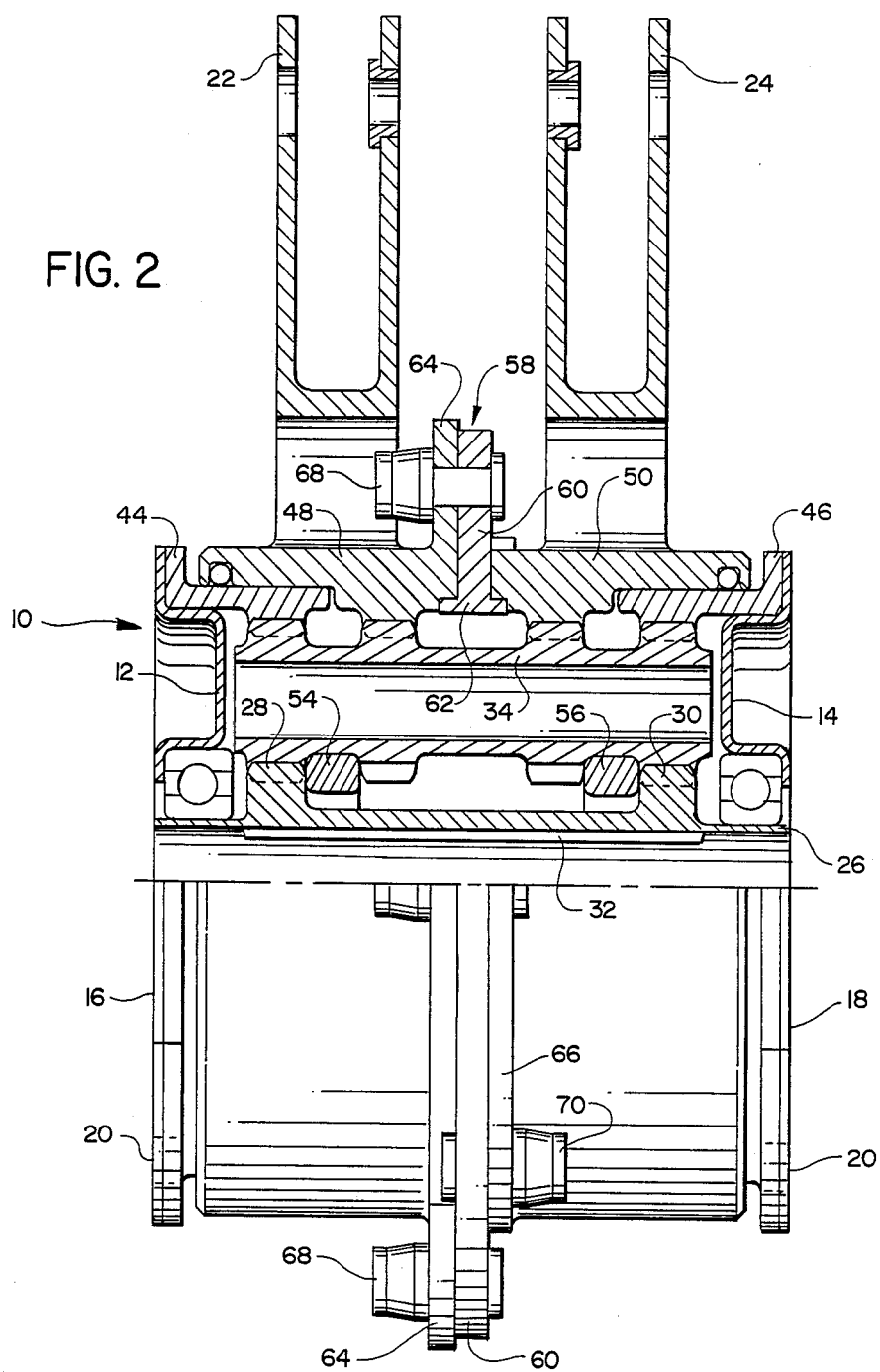

A rotary input is applied to actuator 10 via an input shaft 26. As best viewed in FIG. 2, the shaft 26 is a single input member, spanning the extent of actuator 10 and journalled for relative rotational displacement therein. However, the shaft might equally well be a dual input member—with two shaft elements in concentrically or generally butting engagement should that prove advantageous for a specific design. In any case, first and second sun gears 28 and 30 are secured to the shaft 26 for rotation therewith. The sun gears 28 and 30 may be integral with the shaft 26 or, more preferably, may be splined thereon. Thus, for example, as best viewed in FIG. 2, the shaft 26 includes a spline 32 spanning substantially the extent of the actuator 10 and receiving the sun gears. Regardless of the construction deemed most appropriate for the task at hand, a rotary input on the shaft 26 will cause coincident and parallel rotation of the two sun gears 28 and 30.

As is generally conventional in this variety of gearbox construction, the sun gears engage a plurality of planet gears; five of which are shown in this exemplary embodiment, identified as 34, 36, 38, 40 and 42, respectively. It will be appreciated by those skilled in the art that the absolute number of planets may vary from design to design and, provided appropriate balance is maintained, the basic functionality of the gearbox will remain the same. Irrespective of that consideration, each of the planet gears illustrated in this embodiment extends substantially across the body of actuator 10, with each gear thereby engaging each of the sun gears 28 and 30 separately. First and second fixed ring gear means 44 and 46 are also disposed for separate points of engagement with the planet gears. As best viewed in FIG. 2, each of the fixed ring gears merges inwardly along a leg lying parallel with the rotational axis of the actuator from a respective one of the end walls 12 and 14 for engagement with the end portions of the planet gears. First and second discrete output gear means 48 and 50 likewise separately engage the planet gears, interiorly of the fixed ring gears; whereby an input through shaft 26 causes the planet gears both to rotate and to circulate within an annular orbit 52 against the fixed ring gears in order to translate rotational motion into the output gears. Proper alignment of the planet gears with the sun gears during relative rotational displacement thereof is provided and insured by first and second separator rings 54 and 56. As respects the coupling of forces across the actuator, the gear ratio will dictate the relative rotational displacement of the output gears vis-a-vis the input shaft. As best viewed in FIG. 2, each of the output arms 22 and 24 is joined to a respective one of the output gears for direct movement therewith along parallel arcuate paths, the extent of which is dictated by the gear ratio. In the context of the intended utility for the rotary actuator 10 in conjunction with a control surface, an exemplary gear ratio would be approximately 230:1. This aspect of the invention is considered in further detail below.

It is apparent from the description thus far that two distinct load paths are provided through the rotary actuator 10. From an applied rotary input on shaft 26, a first path is provided by the sun gear 28, across the cooperative planet (e.g., 34) and the respective fixed ring gear 44 and output gear 48; while a second and distinct load path exists from the sun gear 30, across the planet gear to the respective fixed ring gear 46 and output gear 50. Should one or more of the components within or along either of the distinct load paths fail, the parallel alternative path remains to provide a stiff link. And too, should a separator ring 54 or 56 fail, the dual sun gears still protect against collapse of the planets. Still further, the span of spline 32 in the exemplary embodiment maintains soundness of the device along one load path should a failure occur in the other. It is, accordingly, apparent that reliable integrity is maintained even in the face of a component failure.

It is to be anticipated that a gross structural failure may occur apart from a failure in, e.g., one of the gears comprising the actuator 10. For instance, there is a statistical probability for failure in the outer case—for example, one of the output gears themselves. The design of the rotary actuator 10 is made with an eye toward halting the propagation of a failure of that sort and preventing, e.g., a fracture from being transmitted from one side of the device to the other. A center ring designated generally as 58 is interposed circumferentially intermediate the actuator for that purpose.

The center ring 58 is shown in the figures to be an annular plate comprised of a circular web 60 having a lip 62 at its inner radius. The lip 62 projects laterally into cooperative engagement with the output gears 48 and 50, while the web 60 projects radially outward between the same. The output gear 48 includes a radial leg 64 disposed in engagement with the web 60 on one side while the output gear 50 has a corresponding radial leg 66 disposed in engagement with web 60 on the opposite side. The two radial legs are secured separately to the center ring 58 by staggered arrays of fasteners. More specifically, the radial leg 64 is joined to the web 60 by a first array of fasteners 68; four such fasteners shown in the figures to be spaced generally equiangularly about the center ring. The radial leg 66, however, is secured independently to the web 60 by an array of fasteners 70 from the opposite side; wherein the array is again one of four fasteners spaced equiangularly, but staggered or offset with respect to the array of fasteners 68. A failure, such as a fracture, occuring on one side of the actuator 10 will be halted at the center ring 58, by preventing propagation of the crack from travelling to the other side of the actuator. Likewise, the staggered array of fasteners 68 and 70 will allow failure of any one fastener to occur within affecting the integrity of the actuator across the center ring 58.

The failsafe features of the actuator 10 provided by the foregoing structural arrangements are desirably augmented to prevent a back driving of the device from the output side thereof in the event of a failure. The objective of maintaining a rigid link to the control surface associated with the actuator 10 would not be realized completely if, in the event of failure, the operative load path through the device were susceptible of being back driven by the control surface itself. A combination of proper selection of the gear ratio for the actuator 10 and an appropriate tooth form for the gears assists in achieving the related objective of irreversibility of drive for the device. As noted above, an exemplary gear ratio for a rotary actuator manipulating a control surface of an aircraft is approximately 230:1. It has been determined that the differential portion of that ratio (or whatever other one may be selected for another specific design) should be at least 39, all other things being equal, for most cases in the intended environment for the actuator 10. By a "differential portion of the gear ratio" of at least 39, it is meant that 39 revolutions of a planet are required to produce one revolution of an output arm. In general, a differential portion of the ratio in the range of from about 39 to about 64 is determined to be adequate except in highly specific instances; those skilled in the art being appreciative of the manner of adaptability of such ratios to achieve the objective at hand. That factor (i.e., gear ratio) operates in conjunction with a tooth form employing a high degree of recess action. Together, this will insure or tend to promote a jamming or locking of the device at a differential stage, rather than allow power transmission across the device should there be a tendency for back driving through the output arms 22 and 24 (or either one of them). Along these lines, the skilled artisan will further and readily appreciate the fact that the "degree of recess" admits of no fixed parameters generally determinable from first principles. But, guided by the structural details set forth herein, those skilled in the art will have no difficulty in selecting both the proper gear ratio and tooth recess aspect necessary to meet a given design objective. While this same goal of irreversibility could equally well be realized by employing a so-called "no-back" or brake, the design of choice is the aforesaid combination of judicious selection of gear ratio along with appropriate tooth form, giving due regard to the pitch line of the fixed and movable gears in the actuator.

It is readily apparent in the light of the foregoing discussion of the preferred exemplary embodiment set forth herein that the rotary actuator 10 achieves the goal of a failsafe rotary actuator capable of maintaining an irreversible stiff link with a control surface of an aircraft irrespective of a failure within the device. The dual load paths minimize the probability that an internal failure within the device will allow loss of output rigidity or for the device to be back driven since a second independent load path is provided. In like vein, a gross failure in the nature of a fracture or crack is capable of propagating only across one-half of the actuator; rendering the other half relatively insensitive to such an occurrence at least in respect of its ability to maintain that desirable link with the control surface.

While the invention has now been described with reference to certain preferred embodiments and illustrated with respect to a preferred utility therefor, those skilled in the art will appreciate that various substitutions, changes, omissions, and modifications may be made without departing from the spirit thereof. Accordingly, it is intended that the scope of the present invention be limited solely by that of the claims granted herein.

What is claimed is:

1. A failsafe rotary actuator providing dual, independent load paths between an input drive member and a common output driven member, comprising:
   a. an input shaft means journalled for rotation within an actuator housing, said input shaft means adapted to be driven by said input drive member;
   b. first and second sun gear means secured in spaced relationship to said input shaft means for rotation therewith;
   c. a plurality of planet gear means disposed for orbital rotation with and circulation about said sun gear means;
   d. first and second fixed ring gear means disposed for independent engagement with said planet gear means; and
   e. first and second output gear means disposed for independent driving contact with said planet gear means, each of said output gear means adapted to be independently coupled to said common output driven member;

wherein a first load path is established between said first sun gear means and said first output gear means across said planet gear means and cooperative engagement thereof with said first fixed ring gear means, and a second load path is established between said second sun gear means and said second output gear means across said planet gear means and cooperative engagement thereof with said second fixed ring gear means, said load paths being independent one from the other such that a failure in one of said load paths does not interrupt the remaining load path between said input drive member and said common output driven member.

2. The failsafe rotary actuator of claim 1, wherein each of said planet gear means spans said housing in cooperative engagement with both of said sun gear means.

3. The failsafe rotary actuator of claims 1 or 2, further comprising center ring means disposed circumferentially intermediate said housing and said dual load paths for failure isolation thereof.

4. The failsafe rotary actuator of claim 3, wherein said center ring is disposed intermediate said first and second output gear means projecting radially outward therefrom and separately secured thereto by first and second arrays of fastening means.

5. The failsafe rotary actuator of claim 4, wherein said first output gear means is secured to said center ring by said first array of fastening means and said second output gear is secured to said center ring by said second array of fastening means staggered from said first array.

6. The failsafe rotary actuator of claim 3, wherein the differential portion of the gear ratio thereof, corresponding to the number of rotations of said planet gear means necessary to produce one rotation of said output gear means, is at least 39 and said gear means include recess action sufficient to prevent back driving of said actuator.

7. The failsafe rotary actuator of claim 6, wherein said differential portion of said gear ratio is in the range of from about 39 to about 64.

8. The failsafe rotary actuator of claim 3, wherein said input shaft means comprises spline means securing both of said sun gear means.

* * * * *